United States Patent
Jarett

(10) Patent No.: US 7,200,359 B2
(45) Date of Patent: Apr. 3, 2007

(54) DUAL TRANSMISSION EMERGENCY COMMUNICATION SYSTEM

(75) Inventor: Keith Jarett, Lafayette, CA (US)

(73) Assignee: The Boeing Company, Chicago, IL (US)

( * ) Notice: Subject to any disclaimer, the term of this patent is extended or adjusted under 35 U.S.C. 154(b) by 485 days.

(21) Appl. No.: 10/337,530

(22) Filed: Jan. 7, 2003

(65) Prior Publication Data

US 2004/0198312 A1    Oct. 7, 2004

(51) Int. Cl.
*H04B 7/185*    (2006.01)

(52) U.S. Cl. .................. 455/12.1; 455/404.1; 455/427; 455/428

(58) Field of Classification Search .............. 455/12.1, 455/427, 429, 404.1, 426.1, 426.2, 428, 430; 340/902; 343/761; 348/143; 375/296; 370/395.43
See application file for complete search history.

(56) References Cited

U.S. PATENT DOCUMENTS

| | | | | | |
|---|---|---|---|---|---|
| 5,235,329 | A | * | 8/1993 | Jackson | ....................... 340/902 |
| 5,274,938 | A | * | 1/1994 | McDonald et al. | ........... 40/617 |
| 5,414,432 | A | * | 5/1995 | Penny et al. | ............ 342/357.16 |
| 5,757,284 | A | * | 5/1998 | Trizzino et al. | .............. 340/902 |
| 5,974,315 | A | * | 10/1999 | Hudson | ....................... 455/427 |
| 6,125,283 | A | * | 9/2000 | Kolev et al. | .............. 455/552.1 |
| 6,212,378 | B1 | * | 4/2001 | Wismer | ....................... 455/429 |
| 6,252,519 | B1 | * | 6/2001 | McKenna | .................... 340/902 |
| 2002/0080799 | A1 | * | 6/2002 | Voce et al. | ............ 370/395.43 |
| 2005/0153645 | A1 | * | 7/2005 | Anderson et al. | ........... 455/12.1 |

* cited by examiner

*Primary Examiner*—Quochien B. Vuong
*Assistant Examiner*—Tuan H. Nguyen
(74) *Attorney, Agent, or Firm*—Ostrager Chong Flaherty & Broitman P.C.

(57) ABSTRACT

A telematic emergency communication system is provided. The system includes a user terminal that generates emergency communication signals within an emergency signal band. A spacecraft network has a first emergency mode receiver and attempts to receive the emergency signals via a spacecraft. A terrestrial network has a second emergency mode receiver and receives the emergency signals when the spacecraft network is unable to sufficiently detect the emergency signals and routes the emergency signals to a control center. A method of performing the same is also provided.

20 Claims, 3 Drawing Sheets

DUAL TRANSMISSION EMERGENCY COMMUNICATION SYSTEM

TECHNICAL FIELD

The present invention relates generally to automotive vehicle systems, and more particularly, to a method and system for transmitting and receiving emergency communication signals between a user terminal and a central office.

BACKGROUND OF THE INVENTION

Telematic services and systems, such as OnStar™, allow customers to communicate with a central office in the event of an emergency, from within a vehicle. The telematic systems can initiate communication with the central office and relay vehicle and occupant status information without user intervention. Currently, telematic service communication is provided by terrestrial cellular service providers, which have limited geographic coverage. There is a desire for telematic systems to use satellite communications in order to provide wider geographic availability.

Unfortunately, satellite communication can be hindered or obstructed by interference objects formed of dense materials having low signal transmissive properties. For example, when a vehicle is located within a parking structure, concrete floors of the parking structure can reduce signal power between the vehicle and a satellite. Each interference object, such as each floor of the parking structure that is inbetween the vehicle and the satellite can reduce signal power by 10 dB, or a factor of 10 or more.

Transmission power of a satellite is larger than that of user terminals or cellular communication devices within a vehicle. The reduction in signal power, due to interference objects, can cause attenuation of transmitted uplink signals from the vehicle to such an extent as to prevent communication with the satellite.

It has been suggested that in order to increase signal penetration of interfering obstructions, that transmission power levels be increased and that data transmission rates be decreased. Transmission power levels may to some extent be increased on a satellite but increased power is unlikely on a user terminal, due to physical and cost restraints. However, both uplink and downlink communication can be improved by reducing the data rate and increasing the duration of the transmission. For example, a signal transmitted at a data rate of 4 bits/sec has approximately a 30 db advantage over a signal transmitted at a data rate above 4 Kbits/sec.

Satellite communication networks and terrestrial wireless networks have complementary strengths and weaknesses. Satellite networks cover wide geographical areas, while terrestrial networks are limited to areas that are within a range of a set of base stations. On the other hand, terrestrial networks are better capable of serving large populated user areas than are satellites. To provide for heavy concentrations of users, within a terrestrial network, additional base stations are utilized within heavily populated user areas. In order to benefit from strengths of both the satellite networks and the terrestrial networks, sharing communication frequency bands between satellite networks and terrestrial networks has been suggested. Unfortunately, to share communication bands typically requires complex and extensive coordination between satellite and terrestrial networks.

Another disadvantage of using a satellite network over an urban area, for which a terrestrial network is commonly used, is that obstruction of communication signals commonly occurs due to buildings and other objects. Terrestrial base stations are inherently better for receiving communication signals from a user terminal than a spacecraft, due to angles of transmission. For example, when a user terminal is within a parking structure, in communicating with a satellite, transmission angle is approximately between 45°–90°. When the same user terminal is in communication with a base station, transmission angle is typically less than 5°, allowing the signals to be transmitted through fewer dense obstructions, such as concrete floors of a parking structure.

Although the obstructions may be fewer in the horizontal direction, certain features of cellular air interface design limit communication with the terrestrial base stations. Power levels of base station transmissions are limited in order to reduce interference with nearby cellular terminals, which use the same frequency. Terrestrial wireless communication standards do not support communication when the user terminal is unable to sufficiently detect a transmitted signal from the base station. Therefore, when base station normal transmission power is insufficient to penetrate a parking structure, cellular-based communication cannot occur. Cellular air interface standards do not permit ad hoc increase of base station transmitting power to overcome signal path losses and increases in power by a user terminal to reach the base station. Further, cellular air interface standards do not support communication at data rates less than approximately 4 Kbits/sec, net after error correction coding. Ultra-low data rates improve transmission of an emergency signal through obstructions. An emergency signal only requires transmission of a few bits per second.

It would therefore be desirable to provide a larger geographical area coverage telematic system that provides communication capability with user terminals, especially during emergency situations when interference objects are present, as described above.

SUMMARY OF THE INVENTION

The present invention provides method and system for transmitting and receiving emergency communication signals between a user terminal and a central office. A telematic emergency communication system is provided. The system includes a user terminal that generates emergency communication signals within an emergency signal band. A spacecraft network has a first emergency mode receiver and attempts to receive the emergency signals via a spacecraft. A terrestrial network has a second emergency mode receiver and receives the emergency signals when the spacecraft network is unable to sufficiently detect the emergency signals and routes the emergency signals to a control center. A method of performing the same is also provided.

The present invention has several advantages over existing telematic communication systems. One advantage is that it provides a system and method of communicating with a user terminal in the presence of obstructing objects.

Another advantage of the present invention is that it allows a control center to respond to a user terminal in situations when communication may not otherwise have been possible.

Furthermore, the present invention potentially increases geographical coverage and response time of a telematic system by providing emergency communication, between a user terminal and both a spacecraft network and a terrestrial network having less obstruction.

Moreover, the present invention provides versatility in that emergency communication may be transmitted and received to and from a user terminal in geographical areas of various population.

DETAILED DESCRIPTION OF THE PREFERRED EMBODIMENT

Figure 1:
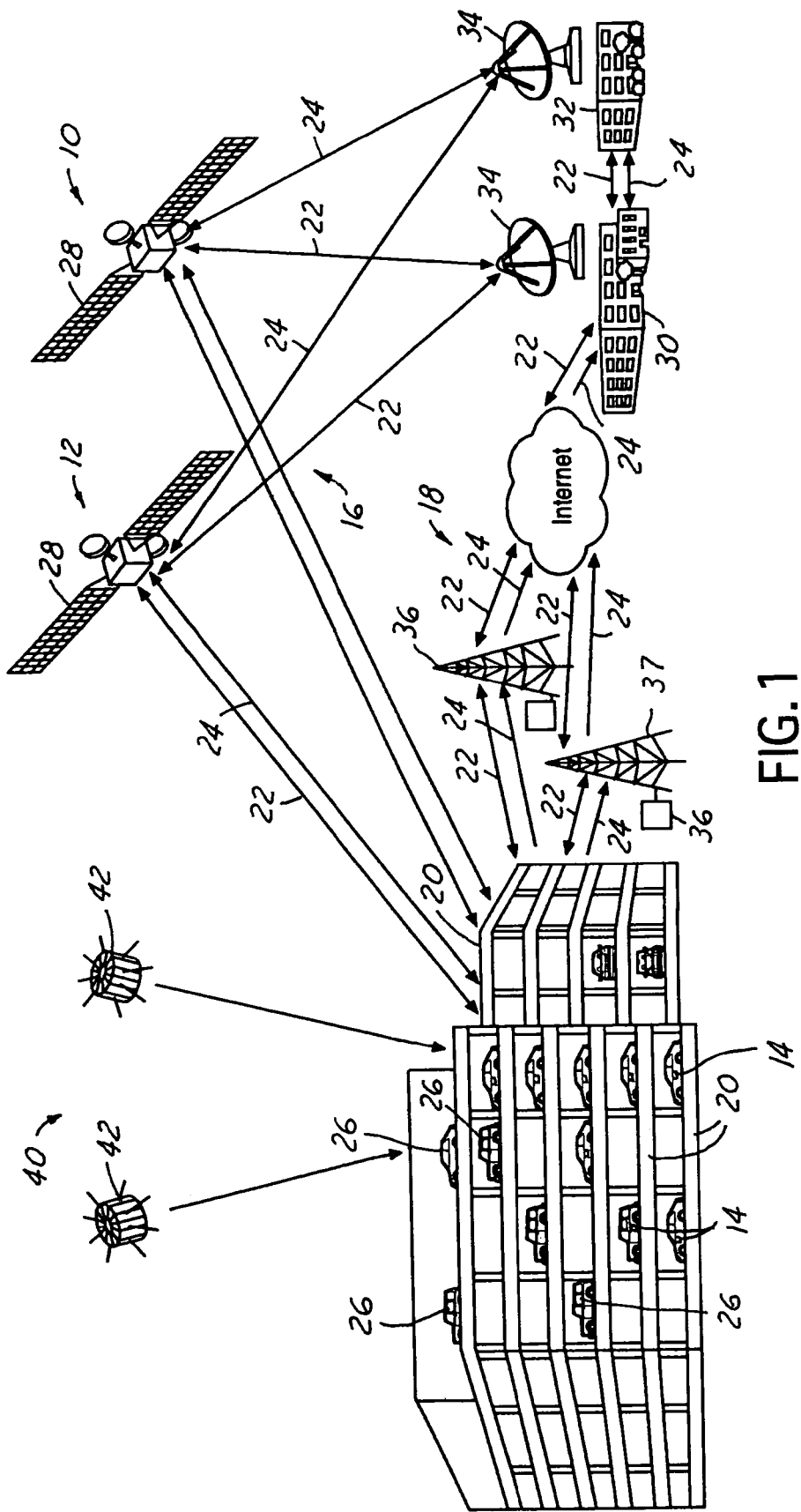
FIG. 1 is a perspective view of an emergency communication network in accordance with an embodiment of the present invention.

A satellite network for mobile users is generally allocated a frequency band similar to those used for terrestrial personal communication services (PCS) cellular communication. Due to current licensing availability and requirements, a frequency band that is allocated for both satellite and terrestrial communication does not exist. Current cellular terrestrial transceivers are not currently designed to have both normal and emergency modes, with the emergency mode having a lower transmission data rate. As known in the art, a lower transmission data rate increases ability to wirelessly communicate through obstructions or from a greater distance. In order to allow a terrestrial network to transmit on the frequency band of the satellite networks a license must be obtained. Also, in order to share a frequency band the satellite networks and the terrestrial networks need to be tightly integrated, which forces a costly re-write of a significant portion of existing terrestrial network software. The present invention overcomes the above-stated obstacles and is described in detail below.

In each of the following figures, the same reference numerals are used to refer to the same components. While the present invention is described with respect to a wireless communication device for a vehicle and a method of manufacturing the same, the present invention may be adapted to be used in various applications including: ground-based vehicles, aeronautical vehicles, watercraft, headliners, vehicle panels, or other applications that may utilize a wireless communication device.

In the following description, various operating parameters and components are described for one constructed embodiment. These specific parameters and components are included as examples and are not meant to be limiting.

Also, the term "obstructing object" refers to a dense object between to communicating devices, which causes attenuation, or interruption of communication signals therebetween. An obstructing object may for example be a floor(s) within a parking structure formed of concrete. Concrete has low signal transmissive properties thus, attenuating communication between a first transceiver such as a user terminal and a second transceiver such as a satellite. An obstructing object may include various man made or naturally formed objects.

Referring now to FIG. 1, a perspective view of a telematic emergency communication network 10 in accordance with an embodiment of the present invention is shown. The emergency network 10 includes a telematic emergency communication system 12 having multiple user terminals 14, a spacecraft network 16, and a terrestrial network 18. The user terminals 14 are in communication with the spacecraft network 16 and the terrestrial network 18 and may be located such that there is an obstructing object 20 between the user terminals 14 and the networks 16 and 18. The spacecraft network 16 is capable of transmitting and receiving normal communication signals 22 and emergency communication signals 24 to and from the user terminals 14. The terrestrial network 18 is capable of transmitting the normal signals 22 to and receiving both communication signals 22 and 24 from the user terminals 14.

The user terminals 14 may be mobile and cellular in nature and located within a vehicle 26, as shown. The user terminals 14 may be of various type and style such as mobile communication terminals, personal electronic systems, a computer, a personal data assistant, a pager, a cell phone, or other user terminal known in the art.

The spacecraft network 16 includes one or more spacecraft 28 that transmit and receive the communication signals 22 and 24 either directly to and from a control center 30 or indirectly to and from the control center 30, via a gateway station 32. Both the control center 30 and the gateway station 32 having ground-based transceivers 34. When transmitted to a gateway station 32, the communication signals 22 and 24 are repackaged to be in proper format for routing to the control center 30.

Although, the spacecraft 28 are shown as satellites and are used to illustrate one embodiment of the present invention other spacecraft may be utilized in transmission of the communication signals 22 and 24, such as a space station. The spacecraft 28 may perform as a frequency translating repeater, such as commonly referred to as a bent pipe, receiving multiple frequencies through a single transmission path or may have multiple pipes, each pipe designated to receive a particular frequency or frequency range.

The terrestrial network 18 also transmits and receives the communication signals 22 and 24 directly to and from the control center 30, via multiple base stations 36 having towers 37. The communication signals 22 and 24 may be transmitted and received either directly between the base stations 36 and the control center 30 or via other terrestrial networks such as an Internet 38, as shown.

The control center 30 routes the communication signals 22 and 24 to respective intended destinations. A global positioning system 40 may also be incorporated into the emergency network 10 to determine location of the user terminals 14, as a result, global positioning satellites 42 are used for user terminal location determination.

Figure 2:
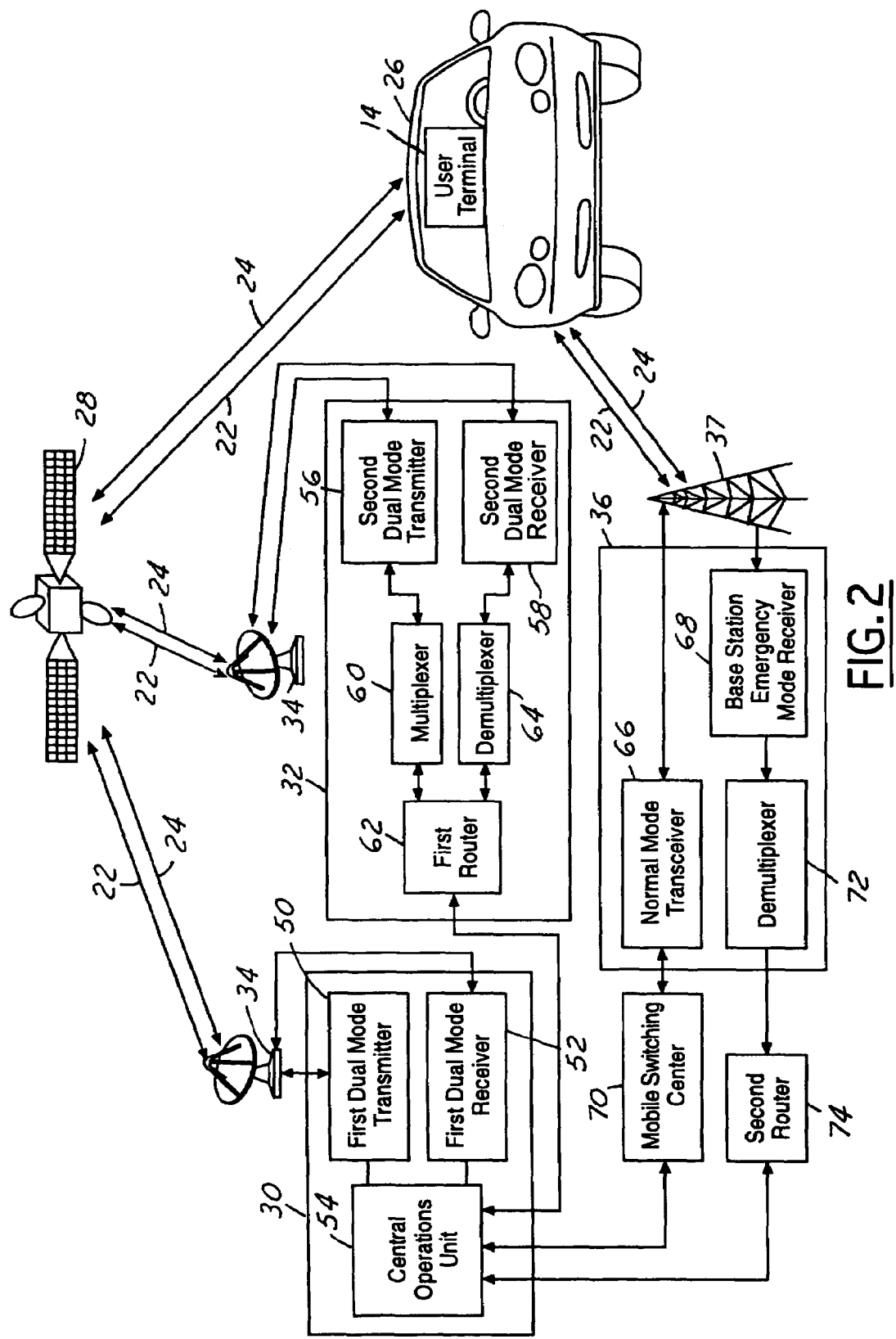
FIG. 2 is a perspective and block diagrammatic view of a telematic emergency communication system in accordance with an embodiment of the present invention.

Referring now to FIG. 2, a perspective and block diagrammatic view of the emergency system 12 in accordance with an embodiment of the present invention is shown. The emergency system 12 has a normal mode and an emergency mode. During the normal mode, the normal signals 22 are transmitted and received between the user terminals 14 and the networks 16 and 18 at a first frequency level. During the emergency mode, the emergency signals 24 are transmitted and received between the user terminals 14 and the networks 16 and 18 at a second frequency level that is lower than the first frequency level.

The emergency signals 24 are preferably at a bit rate at or below approximately 4 bits/sec. In one embodiment of the present invention the normal signals 22 are at a frequency level of approximately 8 Kbits/sec and the emergency signals 24 are at a frequency level of 8 bits/sec. The lower the bit rate of the emergency signals 24 the more likely the emergency signals 24 are able to penetrate obstructing objects.

For direct communication between the spacecraft 28 and the control center 30, the control center 30 includes a first dual mode transmitter 50 and a first dual mode receiver 52. The first transmitter 50 transmits the normal signals 22 during the normal mode and the emergency signals 24 during the emergency mode. The first receiver 52 similarly, receives the normal signals 22 during the normal mode and emergency signals 24 during the emergency mode. A central operations unit 54 controls transmittance of the communication signals 22 and 24 to and from the control center 30.

For indirect communication between the spacecraft 28 and the control center 30 the gateway station 32 includes a second dual mode transmitter 56 and a second dual mode receiver 58. The second transmitter 56 and the second receiver 58 perform similarly as that of the first transmitter 56 and the first receiver 58, respectively. The transmitters 50 and 56 and the receivers 52 and 58 communicate with the spacecraft 28 at a third frequency level different than and as to not interfere with the first frequency level and the second frequency level. A multiplexer 60 is electrically coupled to the second transmitter 56 and multiplexes communication signals, which are routed from the control center 30, via a first router 62. A first demultiplexer 64 is electrically coupled to the second receiver 58 and demultiplexes communication signals between the second receiver 58 and the router 62 before transmission to the control center 30.

The base stations 36 include a normal mode transceiver 66 for transmittance of the normal signals 22 during the normal mode and a base station emergency mode receiver 68 for receiving emergency signals 24 from the user terminal 14 during the emergency mode. A mobile switching network 70 is coupled to the normal mode transceiver 66 and serves multiple purposes including hand-off protocol, tracking of base stations and user association thereof, routing of communication signals 22 and 24 between the base stations 36 and the control center 30, and other purposes known in the art. Emergency signals 24 are demultiplexed by a second demultiplexer 72 and routed to the control center 30, via second router 74.

A base station emergency mode transmitter (not shown) is not necessary, in communication of emergency signals from the control center 30 to the user terminal 14, since transmittance of emergency signals from the control center 30 to the user terminal 14 may be performed via the spacecraft network 16. The spacecraft 28 is able to increase transmission power level and, due to licensing, is permitted to transmit at the desired lower frequency level allowing the emergency signals 24 to penetrate through interference objects. Although to maintain simplicity, a base station emergency mode transmitter is not included in the base stations 36, one may be used.

The emergency mode receiver 68 allows the base stations 36 to receive the emergency signals 24 at low frequency levels below 4 Kbits/sec, unlike receivers of traditional base stations. The present invention in so doing increases emergency communication ability through interference objects. The base stations 36 are able to receive emergency signals 24 through interference objects, that are transmitted at lower power levels, such as from the user terminals 14, due to the low frequency transmission level.

Figure 3:
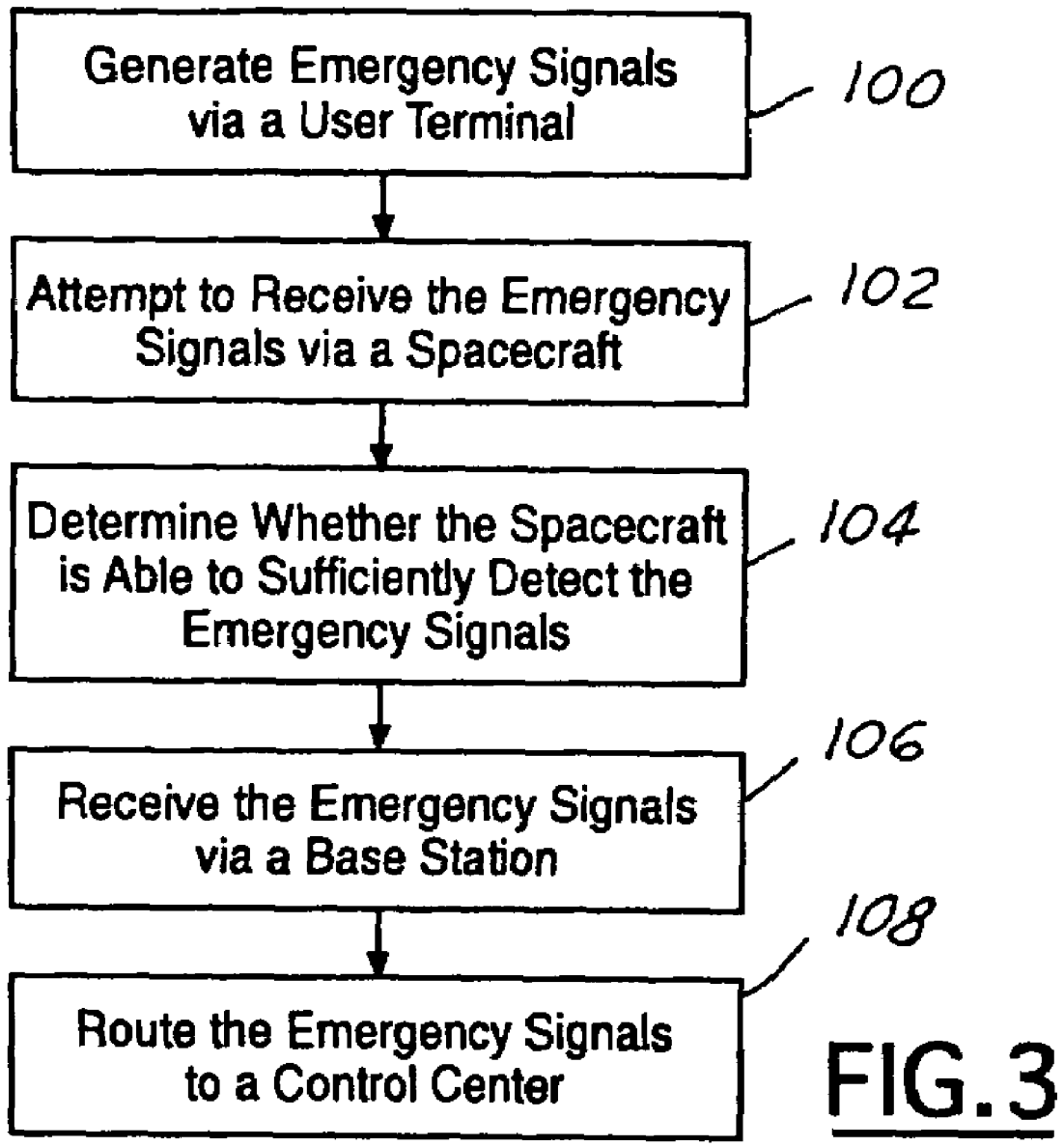
FIG. 3 is a logic flow diagram illustrating a method of telematically communicating with a user terminal in the telematic emergency communication system in accordance with an embodiment of the present invention.

Referring now to FIG. 3, a logic flow diagram illustrating a method of telematically communicating with the user terminals 14 in the emergency system 12 in accordance with an embodiment of the present invention is shown.

In step 100, when in the emergency mode, the user terminals 14 generate the emergency signal 24 within an emergency signal band. In step 102, the spacecraft 28 attempts to receive the emergency signals 24. In step 104, the user terminals 14 determine whether the spacecraft 28 is able to sufficiently detect the emergency communication signal such that it has sufficient magnitude and clarity. When the spacecraft 28 is unable to sufficiently detect the emergency signals 24, emergency communication between the user terminals 14 and the control center 30 is performed via the terrestrial network 18. When the spacecraft 28 is able to sufficiently detect the emergency signals 24, communication with the control center 30 is performed via the spacecraft 28.

In step 106, the emergency mode receiver 68 receives the emergency signals 24. In step 108, the emergency signals 24 are demultiplexed and routed to the control center 30 via the demultiplexer 72 and router 74.

When in the normal mode, the user terminals 14 communicate with the control center 30 via the spacecraft network 16 or the terrestrial network 18 depending upon location of the user terminals 14, population of the user terminal locations, and network availability, similar to prior art telematic communication systems.

Also, the emergency signals 24 may also be transmitted and received between the control center 30 and the user terminals 14 via the spacecraft networks 16 using the dual mode transmitters 50 and 56 and the dual mode receivers 52 and 58.

The above-described steps are meant to be an illustrative example, the steps may be performed sequentially, synchronously, or in a different order depending upon the application.

The present invention provides a telematic emergency communication system that is capable of transmitting and receiving emergency communication signals between a user terminal and a base station through interference objects with increased transmission performance. The present invention utilizes less congested frequency levels below approximately 4 Kbits/sec for emergency communication between a user terminal and a base station. Therefore, the present invention also increases ability to clearly communicate emergency information wirelessly within a highly populated area through obstructing objects.

The above-described apparatus and method, to one skilled in the art, is capable of being adapted for various applications and systems known in the art. The above-described invention can also be varied without deviating from the true scope of the invention.

What is claimed is:

1. A telematic emergency communication system comprising:
   at least one non-emergency based, mobile user terminal having a normal mode and an emergency mode, and being capable during the emergency mode of generating emergency communication signals within an emergency signal band at an emergency mode bit-rate much lower than a normal mode bit-rate;
   a spacecraft network comprising a first emergency mode receiver for attempting to receive said low-bit-rate emergency communication signals from the mobile user terminal during an emergency mode via at least one spacecraft;
   wherein the at least one mobile user terminal is configured to transmit the low-bit-rate emergency communication signals via a terrestrial network if transmission via the at least one spacecraft is not available; and a terrestrial network comprising a second emergency mode receiver, for receiving said low-bit-rate emergency communication signals when transmitted by the mobile user terminal via the terrestrial network and for routing said emergency communication signals to a control center.

2. A system as in claim 1 wherein said user terminal comprises a controller determining whether emergency communication is between said at least one mobile user terminal and said spacecraft network or between said at least one user terminal and said terrestrial network.

3. A system as in claim 1 wherein said emergency communication signals are transmitted from said at least one mobile user terminal at a frequency level of approximately less than 4 Kbits/sec.

4. A system as in claim 1 wherein said spacecraft network comprises a dual mode receiver and a dual mode transmitter each of which having a normal communication mode and an emergency communication mode.

5. A system as in claim 1 further comprising at least one gateway station comprising:
 a router receiving communication signals from said control center;
 a multiplexer electrically coupled to said router and multiplexing said communication signals; and
 a dual mode transmitter electrically coupled to said multiplexer and having a normal communication mode and an emergency communication mode and transmitting said communication signals to said at least one spacecraft.

6. A system as in claim 5 wherein during said normal communication mode said dual mode transmitter is transmitting normal communication signals at a first frequency level and during said emergency communication mode said dual mode transmitter is transmitting emergency communication signals at a second frequency level that is at least 100 times less than said first frequency level.

7. A system as in claim 1 wherein said spacecraft network comprises at least one gateway station comprising:
 a dual mode receiver having a normal communication mode and an emergency communication mode and receiving communication signals from said at least one spacecraft;
 a demultiplexer electrically coupled to said dual mode receiver and demultiplexing said communication signals; and
 a router electrically coupled to said demultiplexer and routing said communication signals to said control center.

8. A system as in claim 7 wherein during said normal communication mode said dual mode receiver is receiving normal communication signals at a first frequency level and during said emergency communication mode said dual mode receiver is receiving emergency communication signals at a second frequency level that is less than said first frequency level.

9. A system as in claim 1 wherein said at least one spacecraft transmits and receives normal communications signals at a first frequency level and receives said emergency communication signals at a second frequency level at least 100 times less than said first frequency level from said at least one mobile user terminal.

10. A system as in claim 1 wherein said terrestrial network comprises:
 a normal mode transceiver receiving and transmitting communication signals; and
 a switching center electrically coupled to said normal mode transceiver and routing said communication signals to said central office.

11. A system as in claim 1 wherein said terrestrial network comprises:
 a base station emergency mode receiver receiving said emergency communication signals;
 a demultiplexer electrically coupled to said base station emergency mode receiver and demultiplexing said emergency communication signals; and
 a router electrically coupled to said demultiplexer and routing said emergency communication signals to said control center.

12. A system as in claim 1 wherein said control center directly transmits and receives said emergency communication signals to and from said at least one spacecraft.

13. A system as in claim 1 wherein said control center comprises a dual mode transmitter and a dual mode receiver for transmitting and receiving normal communication signals and said emergency communication signals directly to and from said at least one spacecraft.

14. A method of telematically communicating with a user terminal in a telematic emergency communication system comprising:
 generating at least one emergency communication signal within an emergency signal band at an emergency mode bit-rate much lower than a normal mode bit-rate via a non-emergency based, mobile user terminal;
 attempting to receive said at least one emergency communication signal with a first emergency mode receiver of a spacecraft network via at least one spacecraft;
 configuring the mobile user terminal to transmit the low-bit-rate emergency communication signals via a terrestrial network if transmission via the at least one spacecraft is not available; and
 receiving said at least one emergency communication signal via a terrestrial network having a second emergency mode receiver for receiving the low-bit-rate emergency communication signal when said spacecraft network is unable receive the low-bit-rate emergency communication signal.

15. A method as in claim 14 further comprising determining whether said at least one emergency communication signal is to be communicated between said user terminal and said spacecraft network or between said user terminal and said terrestrial network.

16. A method as in claim 14 further comprising receiving and transmitting both normal communication signals and emergency communication signals via at least one base station of said terrestrial network.

17. A method as in claim 14 further comprising:
 receiving and transmitting communication signals via a normal mode transmitter within at least one base station of said terrestrial network; and
 routing said communication signals to a central office.

18. A method as in claim 14 further comprising:
 receiving said emergency communication signals via a base station emergency mode receiver within at least one base station of said terrestrial network;
 demultiplexing said emergency communication signals; and
 routing said emergency communication signals to a control center.

19. An emergency telematic communication system comprising:
 a spacecraft network comprising:

at least one gateway station having an first emergency mode receiver and an emergency mode transmitter; and at least one spacecraft attempting to receive and transmit emergency communication signals between at least one user terminal and said at least one gateway station;

at least one user terminal generating said emergency communication signals within an emergency signal band at an emergency mode bit-rate much lower than a normal mode bit-rate, and being configured to transmit the low-bit-rate emergency communication signals via a terrestrial network if transmission via the at least one spacecraft is not available, and generating a site determinative signal; and a terrestrial network comprising;

a second emergency mode receiver for receiving said low-bit-rate emergency communication signals in response to said site determinative signal; and a normal mode transceiver for transmitting and receiving normal communication signals to and from said at least one user terminal.

20. A system as in claim 19 wherein said at least one gateway station comprises:

a dual mode transmitter for transmitting normal communication signals and emergency communication signals; and a dual mode receiver for receiving normal communication signals and emergency communication signals.

\* \* \* \* \*